(12) United States Patent
Ciholas et al.

(10) Patent No.: US 8,380,364 B2
(45) Date of Patent: Feb. 19, 2013

(54) MANUAL AND COMPUTERIZED FLIGHT CONTROL SYSTEM WITH NATURAL FEEDBACK

(75) Inventors: Philippe A. Ciholas, Sedgwick, KS (US); Mark W. Palmer, Peru, KS (US)

(73) Assignee: Textron Innovations, Inc., Providence, RI (US)

( * ) Notice: Subject to any disclaimer, the term of this patent is extended or adjusted under 35 U.S.C. 154(b) by 1520 days.

(21) Appl. No.: 11/383,791

(22) Filed: May 17, 2006

(65) Prior Publication Data

US 2007/0271008 A1 Nov. 22, 2007

(51) Int. Cl.
G01C 23/00 (2006.01)
G05D 1/00 (2006.01)
G05D 3/00 (2006.01)
G06F 7/00 (2006.01)
G06F 17/00 (2006.01)
B64C 29/00 (2006.01)
B64C 3/38 (2006.01)
B64C 5/10 (2006.01)
B64C 9/00 (2006.01)
B64C 13/00 (2006.01)
B64C 13/50 (2006.01)

(52) U.S. Cl. ............ 701/3; 244/23 A; 244/236; 244/99.2
(58) Field of Classification Search ..... 701/3; 244/75.1, 244/76 R, 195, 87, 227, 226, 228, 223, 229
See application file for complete search history.

(56) References Cited

U.S. PATENT DOCUMENTS

| | | | |
|---|---|---|---|
| 2,277,378 A | 3/1942 | Wells | |
| 2,408,770 A | 10/1946 | Frische et al. | |
| 2,451,263 A | 10/1948 | Webb | |
| 2,590,029 A | 3/1952 | Minorsky | |
| 2,595,192 A * | 4/1952 | Garby | 244/87 |
| 2,620,772 A | 12/1952 | McLane | |
| 2,627,847 A * | 2/1953 | Clark et al. | 91/369.1 |
| 2,686,896 A | 8/1954 | Mathews | |
| 2,865,337 A | 12/1958 | Dennis et al. | |
| 2,870,745 A | 1/1959 | Kenyon et al. | |
| 2,953,325 A | 9/1960 | Hadekel | |
| 2,971,726 A * | 2/1961 | Bratt et al. | 244/76 R |
| 2,991,028 A | 7/1961 | Sedgfield et al. | |
| 3,489,379 A | 1/1970 | Bogart | |
| 3,528,633 A | 9/1970 | Knemeyer | |
| 3,578,270 A | 5/1971 | Ellis | |
| 3,592,418 A * | 7/1971 | Wood | 244/226 |
| 3,750,985 A | 8/1973 | Wheldon | |

(Continued)

FOREIGN PATENT DOCUMENTS

FR 1104903 11/1955

OTHER PUBLICATIONS

Select File History from related U.S. Appl. No. 11/669,595, dated Jun. 29, 1010 through Jun. 15, 2012, 42 pages.

*Primary Examiner* — Khoi Tran
*Assistant Examiner* — Nicholas Kiswanto
(74) *Attorney, Agent, or Firm* — Lathrop & Gage LLP (57) ABSTRACT

A system and method for a controlling an aircraft with flight control surfaces that are controlled both manually and by a computing device is disclosed. The present invention improves overall flight control operation by reducing the mechanical flight control surface components while providing sufficient back-up control capability in the event of either a mechanical or power-related failure. Through the present invention, natural feedback is provided to the operator from the mechanical flight control surface which operates independent of computer-aided flight control surfaces.

14 Claims, 7 Drawing Sheets

U.S. PATENT DOCUMENTS

| | | | |
|---|---|---|---|
| 3,753,350 A * | 8/1973 | Nott | 60/403 |
| 3,765,624 A | 10/1973 | Kaniuka | |
| 3,945,593 A | 3/1976 | Schanzer | |
| 4,017,045 A | 4/1977 | Kirchhein | |
| 4,236,685 A | 12/1980 | Kissel | |
| 4,472,780 A | 9/1984 | Chenoweth et al. | |
| 4,477,044 A | 10/1984 | Darcy et al. | |
| 4,759,515 A | 7/1988 | Carl | |
| 4,762,294 A * | 8/1988 | Carl | 244/99.9 |
| 4,793,576 A * | 12/1988 | Frerk | 244/228 |
| 4,964,599 A * | 10/1990 | Farineau | 244/195 |
| 5,082,208 A * | 1/1992 | Matich | 244/78.1 |
| 5,238,207 A | 8/1993 | Wallace et al. | |
| 5,489,830 A | 2/1996 | Fernandez | |
| 5,735,490 A | 4/1998 | Berthet et al. | |
| 5,797,564 A | 8/1998 | Cartmell et al. | |
| 5,868,359 A | 2/1999 | Cartmell et al. | |
| 5,908,177 A * | 6/1999 | Tanaka | 244/223 |
| 6,000,662 A | 12/1999 | Todeschi et al. | |
| 6,241,182 B1 * | 6/2001 | Durandeau et al. | 244/99.4 |
| 6,269,733 B1 * | 8/2001 | Reust | 91/415 |
| 6,622,973 B2 * | 9/2003 | Al-Garni et al. | 244/206 |
| 7,913,955 B2 | 3/2011 | Jones | |

\* cited by examiner

MANUAL AND COMPUTERIZED FLIGHT CONTROL SYSTEM WITH NATURAL FEEDBACK

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Aircraft are typically controlled by moveable aerodynamic surfaces on the wing and tail for controlling the altitude and attitude of the aircraft in flight, including roll, pitch, and yaw. Small aircraft can use simple mechanical linkages to transmit the operator's control inputs to these surfaces. Larger and faster aircraft need power assisted or fully-powered control systems. Most powered control systems use mechanical linkages to command the surface actuators, but "fly-by-wire" and "fly-by-light" are becoming more common. In these systems, the mechanical linkage is replaced by a computerized command and feedback loop.

While manually operated control systems provide a direct and reliable link between the operator's input and the movement of the aircraft control surfaces, these mechanical systems tend to have a poor failure tolerance, and as such, require redundant and independent load paths for continued safe flight and landing, in the event of a failure. As a result, additional hardware and mechanisms are required to provide this redundancy.

With a manual system, the work available at the control surface is limited by the force and travel that an operator can apply to the cockpit controls. As the speed and size of aircraft increase, manual control of the aircraft becomes inadequate to effectively maneuver the aircraft. Various means, including servo tabs and fully powered systems, have been employed to provide the additional force necessary to move the control surfaces. However, these systems add complexity and additional failure modes. For example, fully powered systems are dependent on their power sources, which themselves must be highly redundant. Failure of a fully powered system, without having a manual reversion or back-up, would result in complete failure, and lack of control, of any aircraft control surface. Furthermore, fully powered systems do not provide natural force feedback to the operator. Therefore, artificial feel systems must be added when such a control system is utilized.

The evolution of aircraft design and technology have resulted in a class of aircraft, such as many larger business class jets, that cannot be completely controlled manually and require power-aided controls and would benefit from computer-aided controls. However, fully powered and completely computerized controls, such as fly-by-wire, are not warranted.

SUMMARY

The present invention is defined by the claims below. Embodiments of the present invention solve at least the above problems by providing a system and method for controlling aircraft flight control surfaces both manually and through a computing device. The present invention improves overall flight control operation by reducing the manual flight control surface requirements, supplementing those controls with powered controls, and providing sufficient back-up controls in the event of failures.

In a first aspect, a flight control system is provided comprising at least one control surface having a plurality of independent segments. At least one of the independent segments is coupled to an operator's control means by a mechanical linkage. The remaining independent segments are coupled to powered servo actuators that are, in turn, coupled to a computing device by signal connections.

In a second aspect, a method of providing feedback to an aircraft operator occurs by having at least one segment of a flight control surface that is movable directly by a reversible mechanical linkage. The aerodynamic forces acting on the flight control surface are transmitted by the mechanical linkage to the operator's control means, and felt by the operator. As the operator applies or changes an input force to the system, the linkage and control surface will move until the aerodynamic forces on the control surface balance the operator's input, and equilibrium is achieved. The force the operator applies to this mechanical linkage is measured by force sensors in the control means and relayed to a computing device. The computing device determines the desired position of the remaining segments on the flight control surface in order to complete the desired maneuver input by the operator. A signal is sent from the computing device to a servo actuator, which in turn, moves a segment of the flight control surface to the desired position.

In a final aspect, an apparatus for providing manual and computer-assisted control of an aircraft flight control surface is provided. The apparatus comprises a control means, a mechanical linkage coupled to the control means and to at least one segment of the flight control surface, and a power servo actuator coupled to a non-mechanically linked segment. The apparatus further comprises a signal connection for coupling the powered servo actuator to a computing device, which determines desired segment position based upon input to a control means, and provides a signal to the powered servo actuator to move the segments accordingly.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems and a method for providing aircraft flight control having natural feedback to an operator while providing the operator with increased performance benefits of a computerized control system. Utilizing a computer-controlled flight control system, in combination with a manual system having natural feedback provides excellent fault tolerance because of the continuous independent parallel systems. The term "computer" should be understood to include any type of device having memory and processing capability, and is not meant to be limited to any particular type of computing device. Should one portion of the system fail, the alternate control paths provide sufficient control authority for continued safe flight and landing. Furthermore, utilizing a flight control system having a portion of the flight control surface being controlled by a computing device reduces the quantity of mechanical linkages that can be prone to fatigue, wear, and possible failure. Controlling a portion of the flight surfaces manually allows an operator to receive direct natural feedback through the mechanical linkage, giving the pilot direct "feel" for what is occurring aerodynamically to the aircraft.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware.

Figure 1:
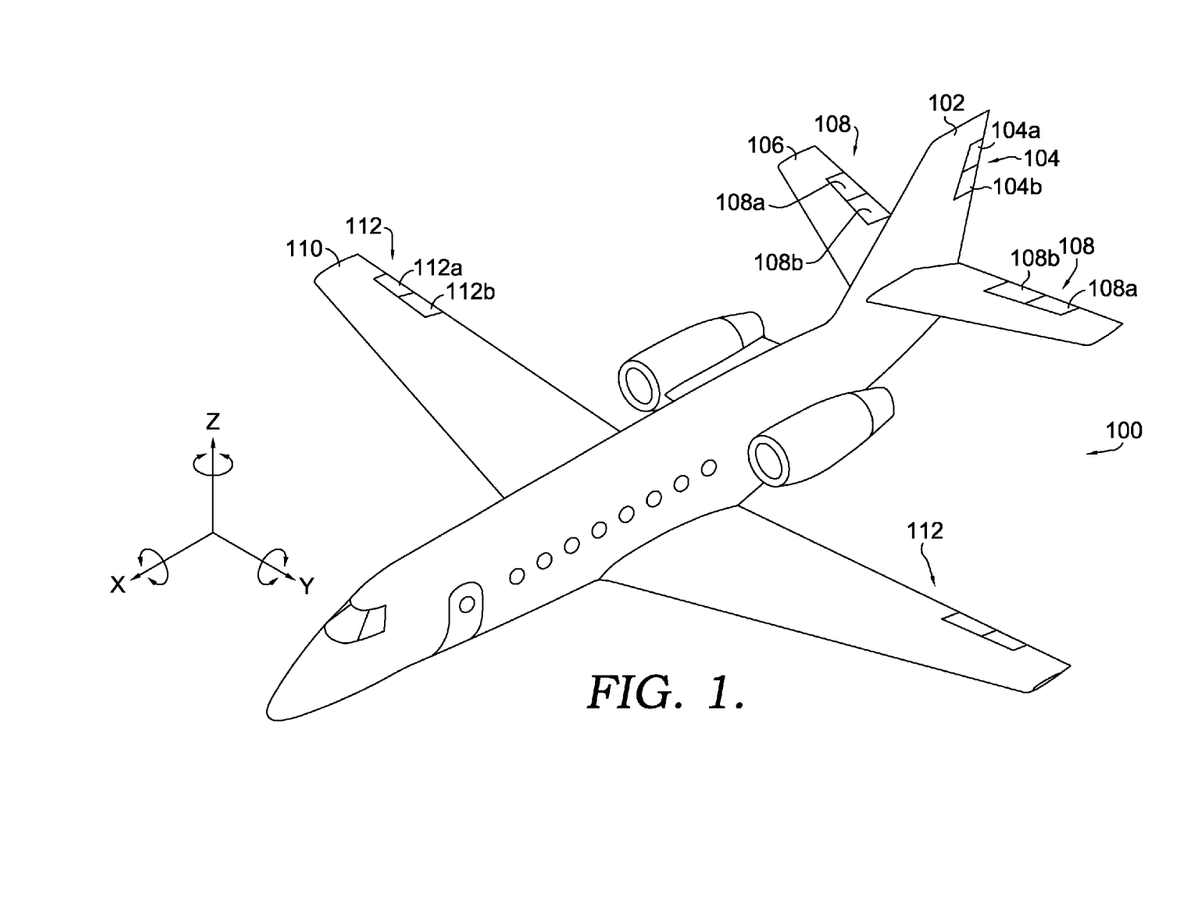
FIG. 1 is a perspective view of the control surfaces of an aircraft.

As aircraft increase in gross weight and airspeed, it becomes more difficult for an operator to manually control the aircraft through the entire flight envelope, such that in order to perform as desired, the use of power assisted control surfaces becomes desirable, and often necessary. Often times these power assisted control surfaces are controlled by a computing device. Referring now to FIG. 1, an aircraft exhibiting these characteristics and therefore utilizing the present invention is shown in a perspective view. For discussion purposes, one example is a larger executive business jet.

The present invention is applicable to a variety of control surfaces, and FIG. 1 shows one possible configuration of the present invention as applied to control surfaces such as rudders, elevators, and ailerons. For example, aircraft 100 has a vertical stabilizer 102 having a rudder, or control surface, 104. For the embodiment shown in FIG. 1, rudder 104 has two independent segments, 104a and 104b. While each of these segments move independently for controlling the yaw of the aircraft, or movement about the z-axis, their combined effects produce the desired yaw response for a given operator's input command.

Aircraft 100 also includes a horizontal stabilizer 106 having a plurality of control surfaces 108. For the embodiment shown in FIGS. 1 and 2, each control surface 108 has individual segments 108a and 108b. While each of these segments move independently for controlling the pitch of the aircraft, or movement about the Y-axis, their combined effects produce the desired response for a given operator's input command.

Figure 2:
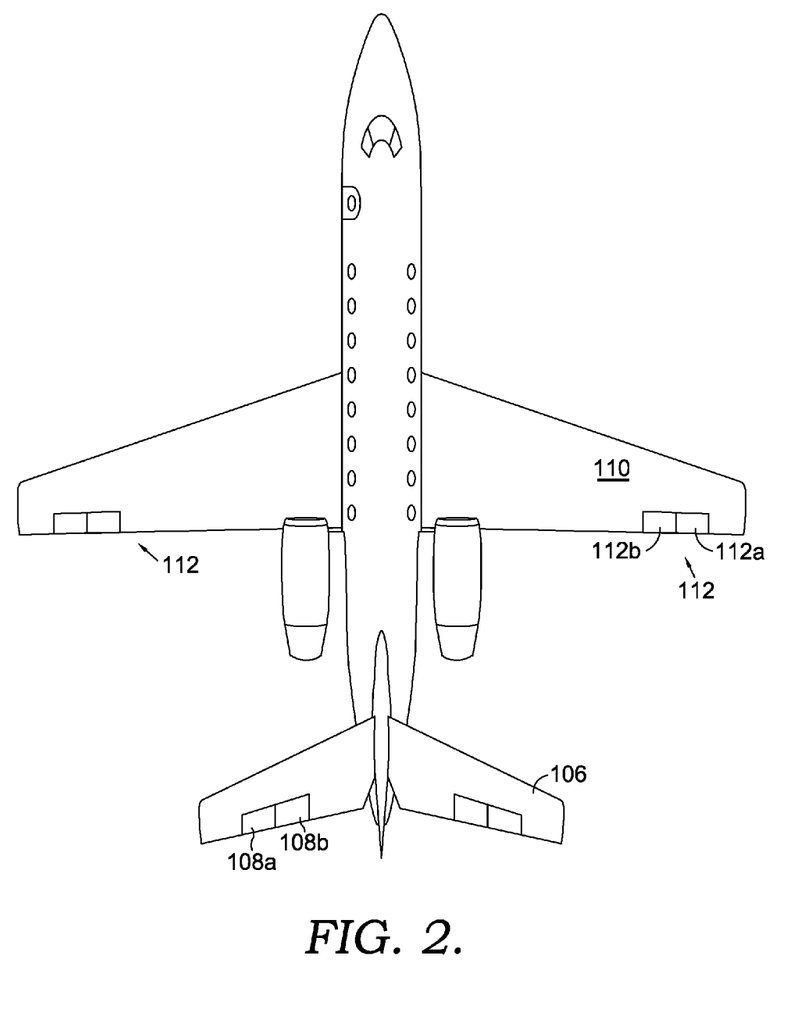
FIG. 2 is a top elevation view of the aircraft of FIG. 1.

Aircraft 100 also has a wing 110 having ailerons 112. The ailerons 112 each have a plurality of individual segments 112a and 112b and can each move up and down, such that they move in opposition to the ailerons on the opposite wing. The ailerons are utilized for controlling the roll rate of the aircraft, or motion about the x-axis of the aircraft. For example, raising the ailerons on the right wing, causes air passing over the wing to push on the ailerons, and push the right wing down, and lowering ailerons on the left wing causes air passing underneath the wing to push on the ailerons to raise the left wing. The result of such a control surface movement is the aircraft rolling to the right. To roll the aircraft to the left, the opposite aileron position is required. While ailerons 112a and 112b move independently for controlling the roll rate of the aircraft, their combined effects produce the desired roll response for a given operator's input command. Spoilers and speedbrakes are also common and can be combined with ailerons for additional roll control and can be directly used for lift and drag control.

Figure 3A:
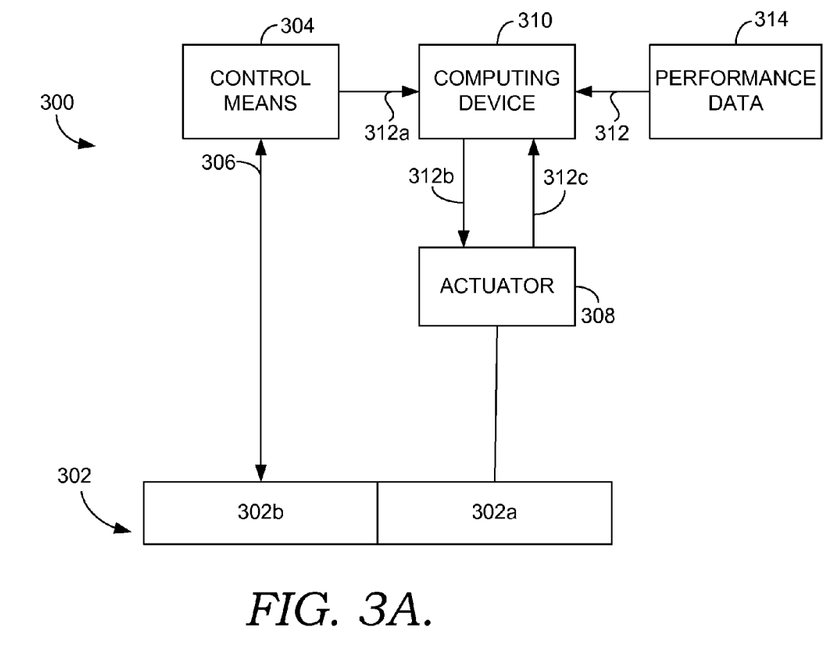
FIG. 3A is a block diagram of an embodiment of the present invention.
Figure 3B:
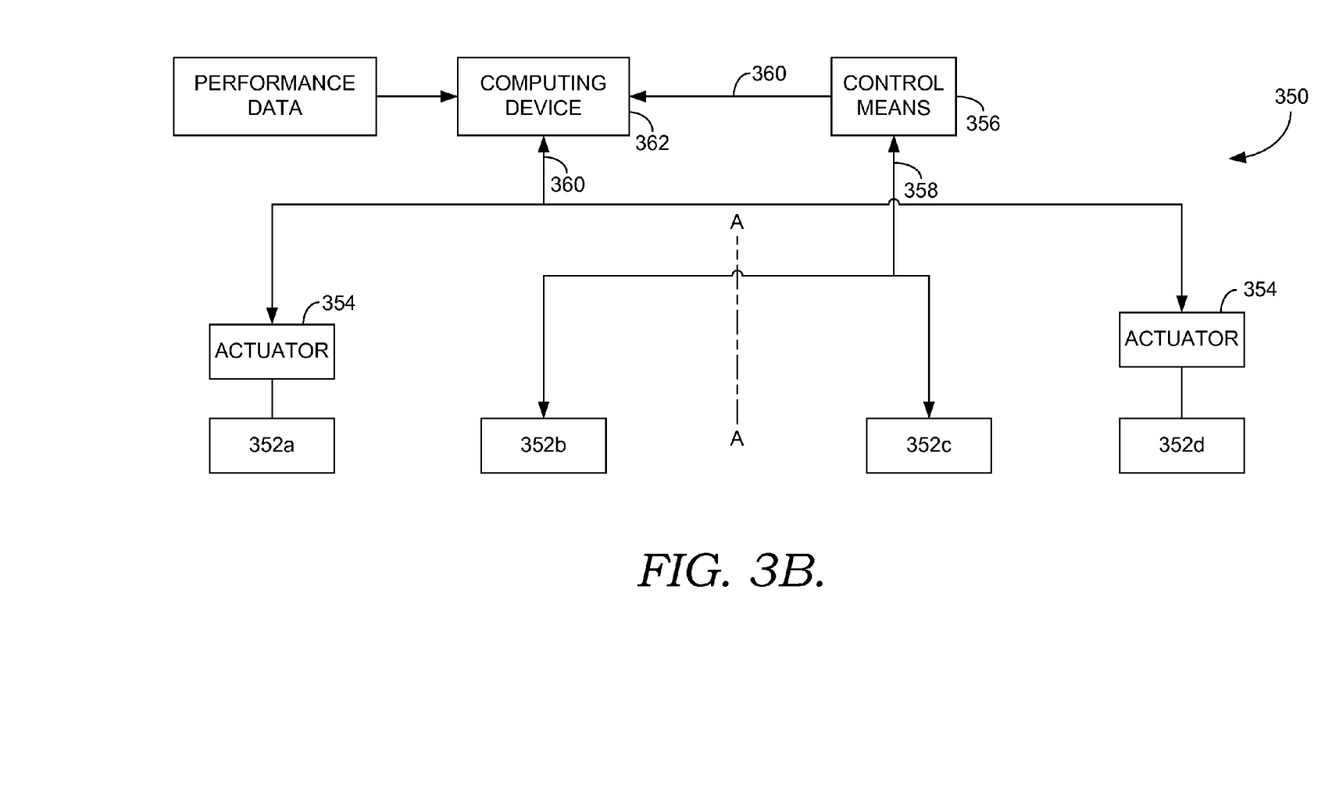
FIG. 3B is a block diagram of an alternate embodiment of the present invention.

Referring now to FIGS. 3A and 3B, block diagrams depicting embodiments of the present invention are shown. Referring first to FIG. 3A, a flight control system 300 comprises at least one control surface 302, such as an aileron, rudder, or elevator, having a plurality of independent segments 302a and 302b. One skilled in the art will understand that the quantity of control surfaces and independent segments will vary depending on at least aircraft class and flight envelope. The flight control system 300 also comprises a control means 304 having at least one force sensor therein for measuring operator effort applied to the control means 304. Typical control means include, but are not limited to, hand-operated controls for pitch and roll such as a yoke or stick, and foot-operated controls for yaw, such as pedals.

In addition to the control means, the flight control system 300 comprises a mechanical linkage 306, that is reversible, and directly couples the control means 304 to one of the independent segments to provide natural feedback to an operator. This mechanical linkage provides direct movement of an independent segment 302b that corresponds to operator movement of the control means 304. The mechanically coupled segment 302b can vary in size with a particular application, but will typically be one-third to one-half of the total control surface 302.

For the embodiment in FIG. 3A, the independent segment 302a is coupled to a powered servo actuator 308. This actuator is in turn coupled to a computing device 310 by signal connections 312. The specific type of signal connections will vary depending on the application, but can include force signals 312a, actuator command signals 312b, and position feedback signals 312c. The computing device 310 is also coupled to the control means 304 by a signal connection 312. In this configuration, the computing device 310 receives the force measurement from the control means 304 by way of the force signals 312a and determines the desired position of segment 302a that corresponds to the force applied to the control means 304. This position is determined from a predetermined schedule which is stored in the computing device 310 and can be based on factors including, but not limited to, measured input force, aircraft normal acceleration, airspeed, and altitude. The computing device 310 provides an actuator command signal 312b to the powered servo actuator 308 to position the independent segment 302a accordingly such that the total combined effects of all of the control surfaces produces the desired aircraft response to the operator's inputs.

In normal, non-failure conditions, the independent segments 302a and 302b both move to achieve the desired aircraft response. However, they may not move to the exact same position since the segments controlled by the computing device are used to optimize handling qualities. That is, depending on operator input, segments 302a may move a greater or lesser distance than segments 302b to accomplish the desired aircraft response. Should the operator attempt maneuvers outside of the allowable flight envelope, the computing device 310 could be used to reduce the effectiveness of segments 302a in order to protect the aircraft structure from damage.

In the event the mechanical linkage 306 jams such that segment 302b becomes inoperable, the remaining segments 302a controlled by the computing device 310 are still operable. Conversely, should a power failure occur in flight such that computing device 310 becomes inoperable, segments 302a will not operate. However, segment 302b is still operable by way of the mechanical linkage 306.

The control surfaces have independent segments that operate independent of each other. One of the segments is connected by a traditional mechanical linkage to the control means in the cockpit and operates and feels to the operator like a traditional control surface, however it has only a portion of the authority of previously monolithic surfaces common in the prior art. The other segment(s) of the control surface are powered and commanded by a computing device based on the operator's input forces to the mechanically-coupled segment. For example, when an operator applies 10 pounds of force into the yoke or stick, that force is transmitted manually to the mechanically-coupled segment, which deflects until the aerodynamic forces balance the operator's input. The same 10 pounds is measured by the computing device, and based on that and other parameters such as flight conditions, the computing device commands the powered segment of the control surface to the desired position. This may or may not be in line with the mechanically-coupled segment. The segments must be split to prevent the actuator force from masking the aerodynamic forces in the feedback to the operator and to allow the powered segment to provide the extra functions such as trim, envelope protection, and stability enhancement.

The control system of the present invention utilizes a plurality of individual segments 302 for a flight control surface. Since each of these segments, both manual and those coupled to the power servo actuators, operate simultaneously, the resulting impact on aircraft attitude and performance is a summation of the effects of the individual segments.

The computing device 310 can also receive performance data 314, including but not limited to altitude, acceleration, and airspeed from a variety of sensors. The computing device 310 utilizes this data to adjust the position of independent segment 302a that is coupled to servo actuator 308, as necessary, to maintain aircraft operation within a desired flight envelope. The present invention can also receive and act on other control commands such as from trim, autopilot, and stability augmentation systems, in place of independent actuators and control surfaces for these systems.

A more detailed embodiment of the present invention is shown in FIG. 3B and pertains to the flight control surfaces found on a wing of an aircraft. In this alternate embodiment, a flight control system 350 comprises four independent segments 352a, 352b, 352c, and 352d, with 352a and 352b on the left wing and 352c and 352d on the right wing, and centerline A-A indicating a fuselage of an aircraft. In this embodiment, each wing has an independent segment that is mechanically coupled to the control means and an independent segment that receives its input from a computing device. More specifically, segments 352a and 352d are each coupled to an actuator 354 and the actuators are, in turn, coupled to control means 356 by way of a signal connection 360 and a computing device 362. The remaining segments shown in FIG. 3B, 352b and 352c, are mechanically coupled to the control means 356 by way of a mechanical linkage 358. Although the embodiment shown in FIG. 3B only discloses two independent segments to each control surface on each wing, the present invention is not to be limited to such a configuration. In fact, the number of independent segments could be greater depending on the type of aircraft and desired flight envelope. Furthermore, alternate embodiments of the present invention may contain different quantity, size, and location of independent segments of the control surfaces without departing from the general scope of the invention.

Figure 4:
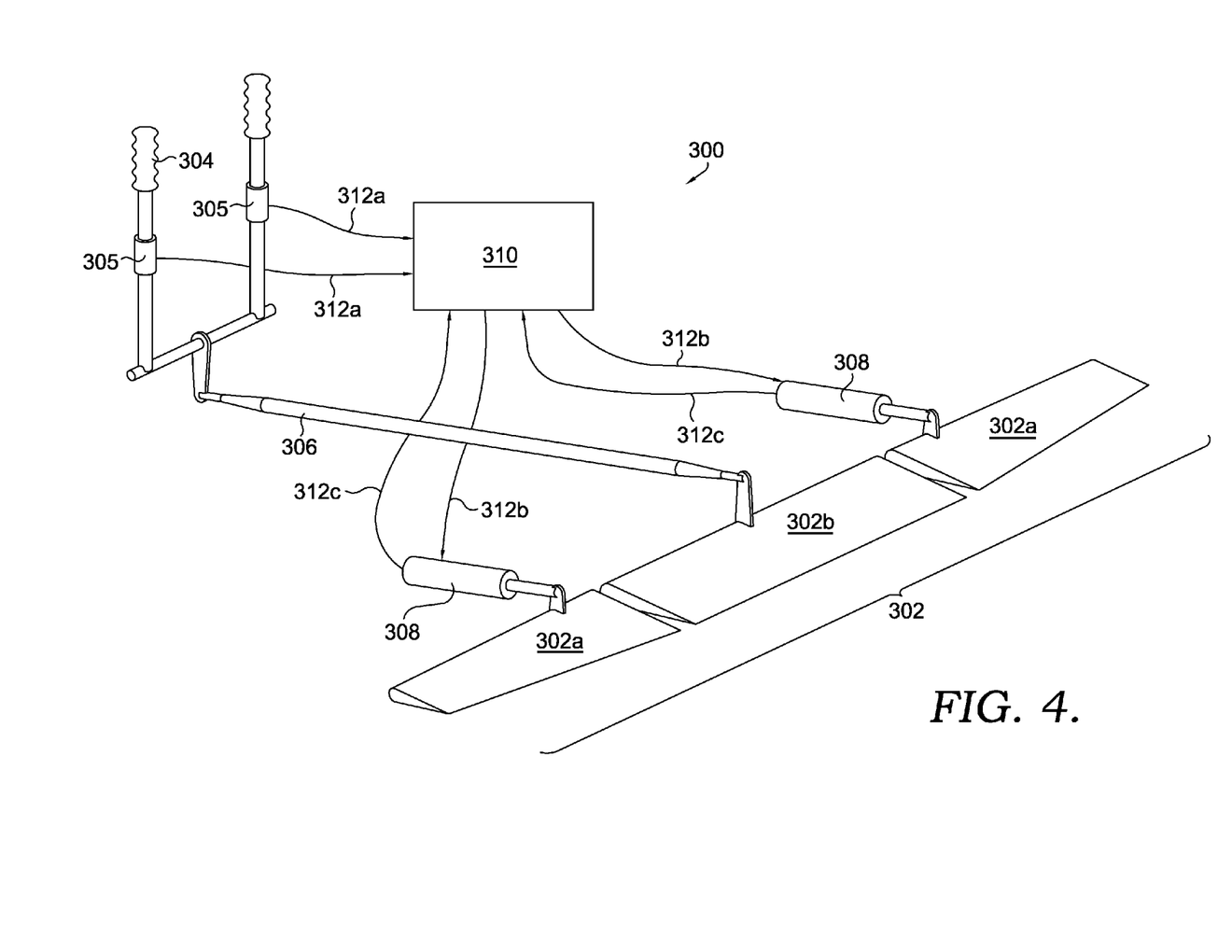
FIG. 4 is a simplified perspective view depicting the features of an embodiment of the present invention.

Referring now to FIG. 4, a simplified flight control system is shown in perspective view depicting the features of an embodiment of the present invention. The flight control system depicted in FIG. 4 corresponds to the general arrangement for pitch control of an aircraft, such as those found on an elevator. This embodiment can be described in conjunction with the terminology previously discussed in reference to FIG. 3A. The flight control system 300 comprises at least one control surface 302 having a plurality of individual segments 302a and 302b, and a control means 304, which for this embodiment is a set of hand-operated control sticks, one for a pilot and a second for a co-pilot. Located in control means 304 are force sensors 305, which measure force input by an operator, and are also coupled to the computing device 310 by the signal connections 312a. In this embodiment where multiple operators have control means, the computing device 310 will average or prioritize the force inputs to determine the net command desired by the operators. The control means 304 is coupled to a segment 302b by a mechanical linkage 306. Coupled to segments 302a, in the embodiment shown in FIG. 4, are powered servo actuators 308. The servo actuators 308 are coupled to a computing device 310 by command signal connections 312b. Position sensors (not shown) in the servo actuators 308 provide position feedback signals 312c to the computing device 310.

Figure 5:
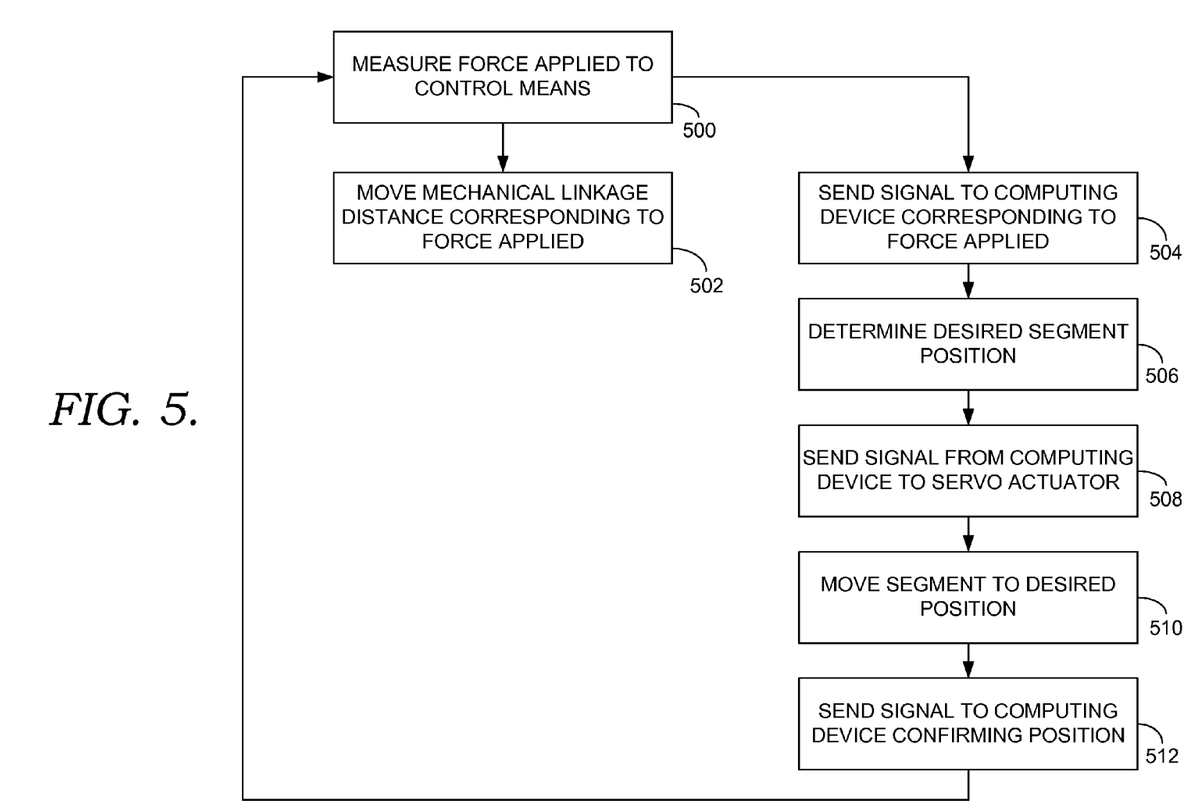
FIG. 5 is a flow diagram depicting an embodiment of the process disclosed in the present invention.

The operation of the control system can best be understood with reference to FIGS. 4 and 5. When movement of an aircraft in a particular direction is desired, the operator applies a force to control means 304. In a step 500, the force applied to the control means 304 is measured. In a step 502, the mechanical linkage 306, which is coupled to the control means 304 moves the individual segment 302b a distance corresponding directly to the movement of the control means 304. The linkage movement will cause control surface 302b to deflect, increasing the aerodynamic forces on that surface, until the operator's applied load and the aerodynamic force on 302b are in equilibrium. A computuerized control system operates in conjunction with the manual portion of the control system to move the remaining independent segments of the control surface 302a, such that a desired maneuver is accomplished, such as increasing the aircraft's pitch attitude.

In a step 504 a signal is sent to the computing device 310 that corresponds to the force applied to the control means 304. In a step 506, the computing device 310 determines a desired position of the remaining segments (302a) that correspond to the force applied by the operator to the control means 304. In a step 508, the computing device 310 sends a signal across connection 312 to the servo actuator 308 corresponding to the desired position. Then in a step 510, the actuator moves the individual segments coupled thereto into the desired position and in a step 512, a signal is sent to the computing device confirming the position of the individual segments.

The position of the segments of the control surfaces are maintained as long as the force level is maintained on the control means. The process then returns to step 500 to measure the force applied to the control means 304. Should the force applied change, either greater or smaller or direction change, then the individual segments making up the control surface will move accordingly, including the manual surfaces and those controlled by the power servo actuators and computing device.

Figure 6:
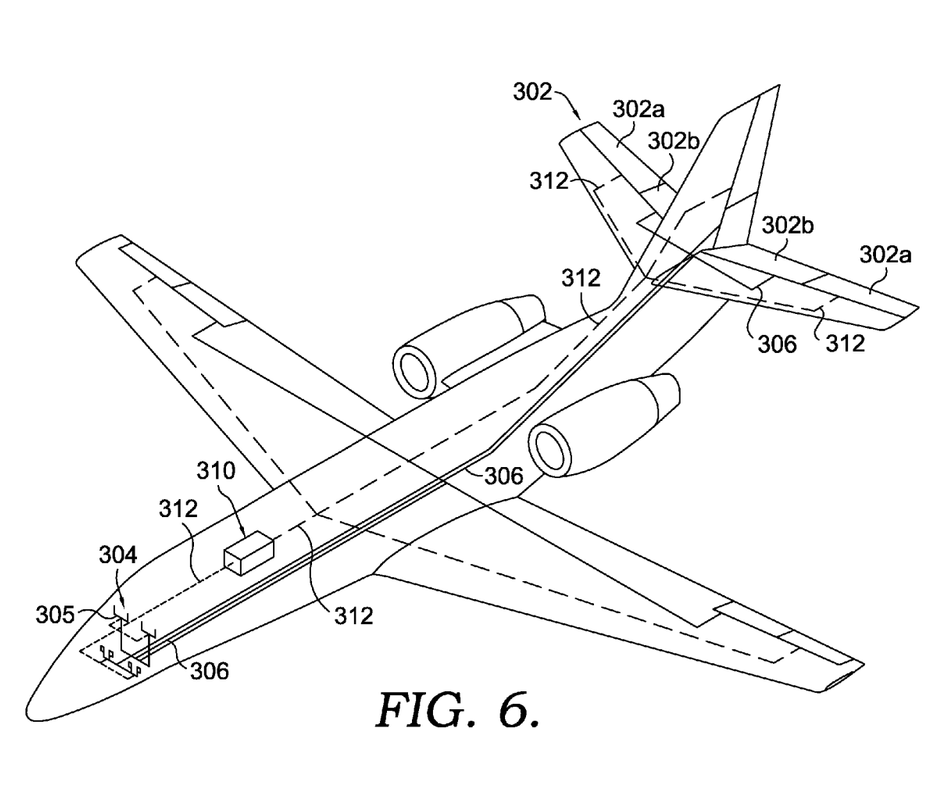
FIG. 6 is a perspective view of an aircraft incorporating the present invention.

An embodiment of the present invention is shown on an aircraft in FIG. 6, including control surfaces similar to those shown in FIG. 4. Utilizing the terminology previously discussed, control surface 302, also referred to as an elevator, has individual segments 302a and 302b, on each side of control surface 302. Segments 302a are coupled by signal to control means 304 through computing device 310, as indicated by a dashed line, while segments 302b are mechanically coupled to the control means 304 by mechanical linkage 306, as indicated by a solid line. The control means 304 has force sensors 305 that send a signal across signal connection 312 to a computing device 310. The computing device 310 then sends a signal across another signal connection 312 to actuators 308 (not shown), which are in turn coupled to segments 302a.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A flight control system comprising:
   at least one control surface having independent segments;
   a control means having at least one force sensor located therein;
   a manual linkage arrangement directly coupling the control means to a first independent segment of the at least one control surface thereby enabling a user to forcibly position the first independent segment during flight without the aid of any hydraulic system;
   the linkage arrangement also adapted to directly receive feedback resulting from aerodynamic forces exerted on the first independent segment during flight, and transmit the aerodynamic forces back to the control means such that the at least one force sensor measures the force applied to the control means by the operator of the system in response to the aerodynamic forces;
   a powered actuator coupled to a second independent segment of the at least one control surface; and
   a signal connection for coupling the powered actuators to a computing device and the computing device to the control means, such that the computing device can provide commands to the powered actuators to position the second independent segment of the control surface according to a predetermined schedule based on force measured at the at least one force sensor;
   wherein no feedback from the second independent segment is measured by the at least one force sensors.

2. The system of claim 1 wherein the at least one control surface is selected from the group comprising rudders, elevators, and ailerons.

3. The system of claim 1 wherein the control means comprises hand-operated and foot-operated controls.

4. The system of claim 1 wherein the manual linkage arrangement provides direct movement of the first independent segment corresponding to movement of the control means by the operator.

5. The system of claim 1 wherein the force sensors are located in a pair of vertical upright members in the control means.

6. The system of claim 1 wherein the computing device receives aircraft performance data and adjusts the position of the second independent segment to maintain operation within a desired flight envelope.

7. The system of claim 1 wherein aircraft movement as a result of control surface changes is a summation of the first independent segment which is not computer controlled and the powered actuator coupled independent segments which alone executes the automated trim, envelope protection, stability enhancing functions at the direction of the computing device during flight.

8. An apparatus comprising:
   a control surface on one side of an aircraft being comprised of a first independently movable segment and a second independently movable segment;
   a control means having a plurality of force sensors located therein;
   a mechanical system directly manual coupling the control means to the first independently movable segment enabling pilot-initiated mechanical forces alone to position the first independently movable segment such that the plurality of force sensors measure the force applied to the control means by the operator of the apparatus in response to the aerodynamic forces acting against the first independently movable segment;
   a powered servo actuator coupled to the second independently movable segment, the second independently movable segment not directly coupled by any mechanical linkage to the control means;
   a signal connection for coupling the powered servo actuators to a computing device and the computing device to the control means, such that the computing device sends a signal to the powered servo actuators for the second independently movable segment coupled thereto to position the second independently movable segment according to a schedule based on force measured at the force sensors.

9. The apparatus of claim 8 wherein the control surface is selected from the group comprising rudders, elevators, and ailerons.

10. The apparatus of claim 9 wherein the control means comprises hand-operated and foot-operated controls.

11. The apparatus of claim 8 wherein the computing device receives aircraft performance data and causes the powered servo actuator to adjust a position of the second, independently movable segment to maintain operation within a desired flight envelope.

12. The system of claim 8 wherein aircraft movement as a result of control surface changes is a summation of the independent movements of the first and second independently movable segments.

13. A method of providing feedback from a control surface to a pilot through a pilot-operated flight control device of an aircraft, the method comprising:
   splitting the control surface into first and second portions;
   directly mechanically linking the first portion to the pilot-operated flight control device such that the pilot alone applies a direct force necessary to operate a corresponding direct movement of the first portion, and aerodynamic forces bearing on the first portion are reciprocated back to be felt by the pilot through the pilot-operated flight control device without interference by any power-related equipment;
   electronically powering and positioning the second portion in response to force data received from the pilot-operated flight control device.

14. The method of claim 13 comprising:
   including both hand and foot controls on the pilot-operated flight control device to receive physical inputs from the pilot; and receiving the force data from sensors on the pilot-operated flight control device upon receiving the physical inputs from the pilot.

* * * * *